United States Patent [19]
Catto

[11] Patent Number: 5,894,898
[45] Date of Patent: Apr. 20, 1999

[54] SOLAR-ELECTRIC MOTOR SCOOTER

[76] Inventor: Craig C. Catto, 15301 Jesus Maria Rd., Mokelumne Hill, Calif. 85245

[21] Appl. No.: 08/725,704

[22] Filed: Oct. 4, 1996

[51] Int. Cl.$^6$ ................................................ B60L 9/00
[52] U.S. Cl. ........................... 180/2.2; 180/181; 180/216
[58] Field of Search ....................... 180/2.2, 65.1, 180/65.2, 65.3, 68.5, 216, 220, 180, 229, 181, 210, 211; 429/83, 99, 120; 454/69, 105

[56] References Cited

U.S. PATENT DOCUMENTS

| | | | |
|---|---|---|---|
| 4,325,448 | 4/1982 | Pivar | 180/216 |
| 4,570,739 | 2/1986 | Kramer | 180/216 |
| 5,036,938 | 8/1991 | Blount et al. | 180/216 |
| 5,452,775 | 9/1995 | Bussinger | 180/216 |
| 5,573,078 | 11/1996 | Stringer et al. | 180/216 |
| 5,725,062 | 3/1998 | Fronek | 180/2.2 |

*Primary Examiner*—Richard M. Camby
*Attorney, Agent, or Firm*—Lothrop & West

[57] ABSTRACT

An electric, three-wheeled motor scooter is described which can derive its motive energy either from a solar-electric array on the vehicle or an independent source of electric power. The vehicle has a unique suspension which permits limited lateral rotation of the forward portion of the vehicle relative to the rear portion, and thereby, facilitates handling and ease of use. Speed and acceleration are controlled through a modulated pulse width controller which supplies pulses of electrical energy to the DC motor in response to throttle commands.

22 Claims, 6 Drawing Sheets

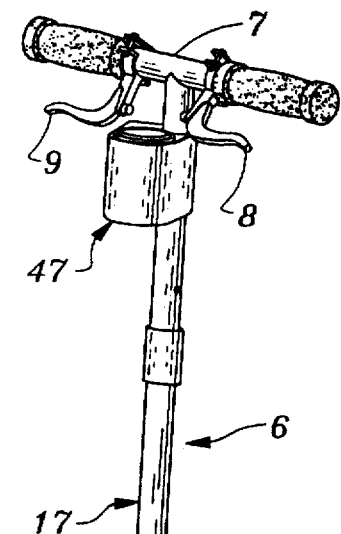
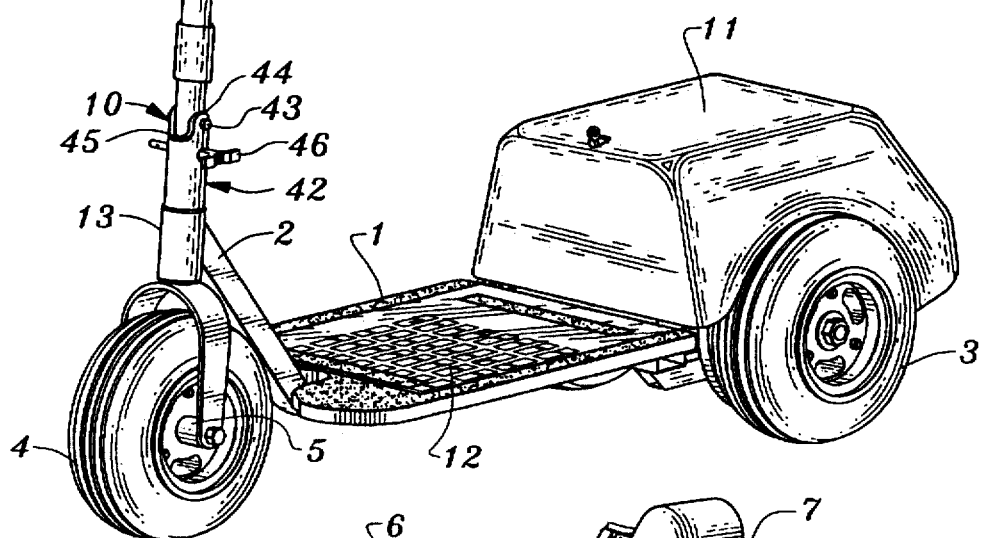
Fig. 1
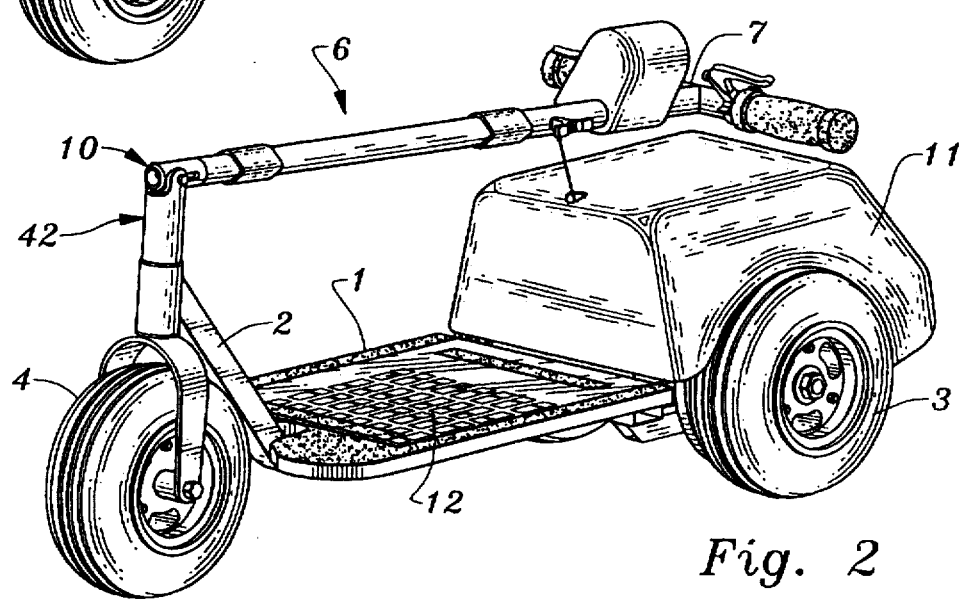
Fig. 2

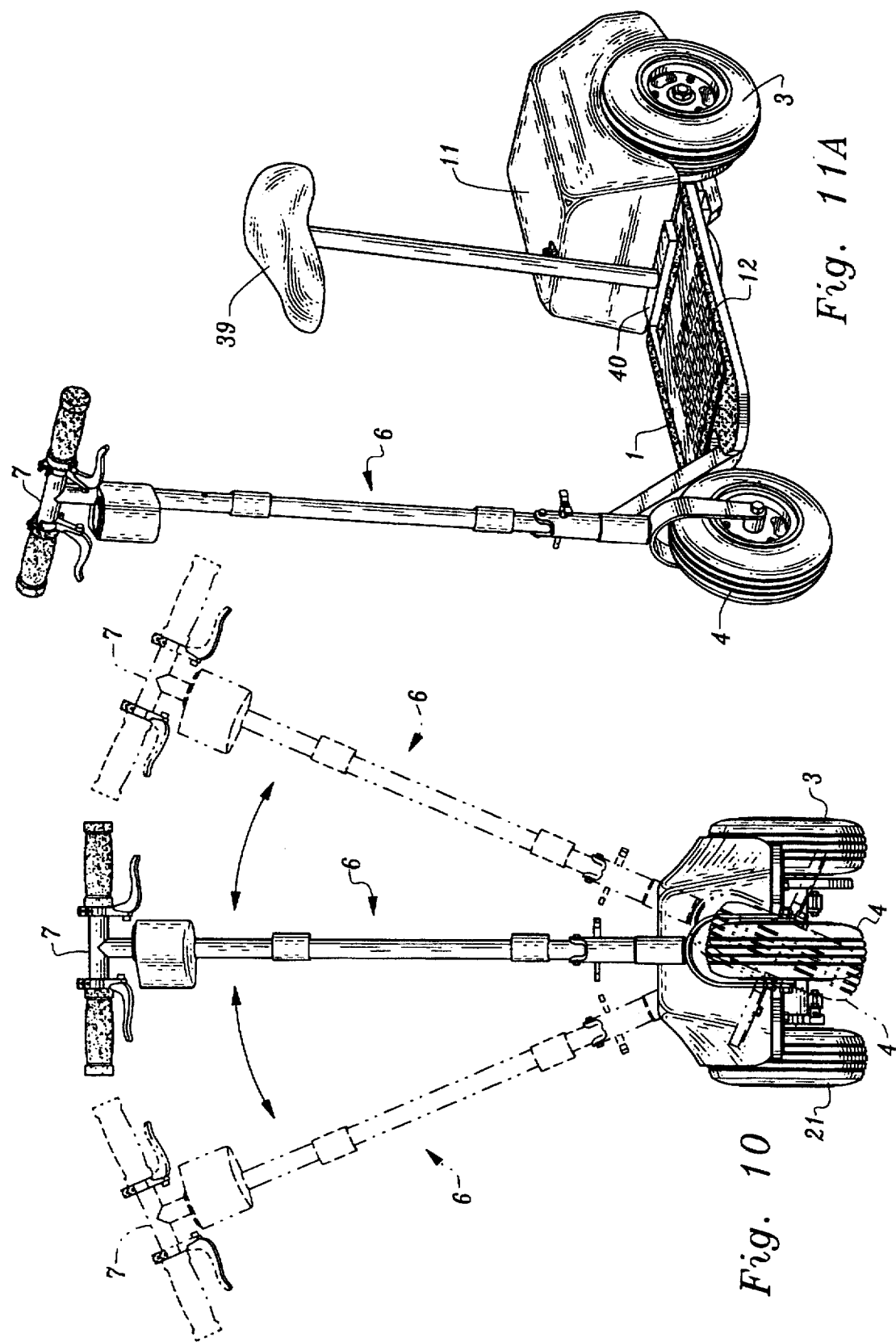

5,894,898

1

SOLAR-ELECTRIC MOTOR SCOOTER

SUMMARY OF THE INVENTION

The present invention relates to a compact, three-wheeled vehicle which is electrically powered and which can derive its motor power from solar energy. More especially, the present invention relates to a three-wheeled, electrically powered scooter which can accommodate one or two persons either standing or seated and which incorporates a unique, efficient speed control system and suspension which greatly facilitates the ease and convenience of using the device.

BACKGROUND OF THE INVENTION

While larger vehicles for transporting people, such as automobiles and airplanes, have become increasingly numerous and important in our society, there has also developed a need for smaller more efficient means for transporting people over relatively short distances without the expense, inconvenience, and environmental concerns usually associated with the use of larger vehicles.

Two-wheeled vehicles such as bicycles and motor cycles have of course been available for many years. These vehicles, however, require a certain amount of dexterity and skill to use safety and conveniently. Further, in the case of the typical motor cycle, there is a great deal of noise and exhaust pollution usually associated with the internal combustion engine which powers these vehicles. In the case of the typical bicycle, a certain amount of physical stamina is also required in order to power the vehicle.

Electrically powered vehicles have recently received increased attention largely because they present a nonpolluting and fuel efficient alternative to the internal combustion engine automobile. For the most part, however, electrically driven vehicles have been relatively large four-wheeled units which have attempted to mimic the internal combustion engine automobile in size and use. Although such vehicles do indeed answer some environmental concerns, they remain relatively large, cumbersome, and expensive vehicles suitable of use only on traditional highways and roads.

Accordingly, it would be desirable to provide an environmentally friendly, quiet, nonpolluting vehicle which is economical to operate and purchase, compact and easy to store and transport and which can provide localized transportation for one or two people especially in nonhighway usage. Such a vehicle should also be safe, easy to park, relatively noncomplex, and, most importantly, pleasurable and easy to operate.

The present invention satisfies all the above requirements by providing a unique electric scooter having smooth power and acceleration and which is stable and easy to ride. Further, the unique three-wheeled of the present invention can derive its electric motor power either from solar energy provided to its battery or by recharging from an electric power line and is therefore quite economical in its operation.

BRIEF DESCRIPTION OF THE DRAWINGS

FIG. 1 is a perspective view of the vehicle of the invention with the steering column in erected position.

FIG. 2 illustrates the vehicle of the invention with the steering column folded in horizontal position.

2

Figures 3, 4:
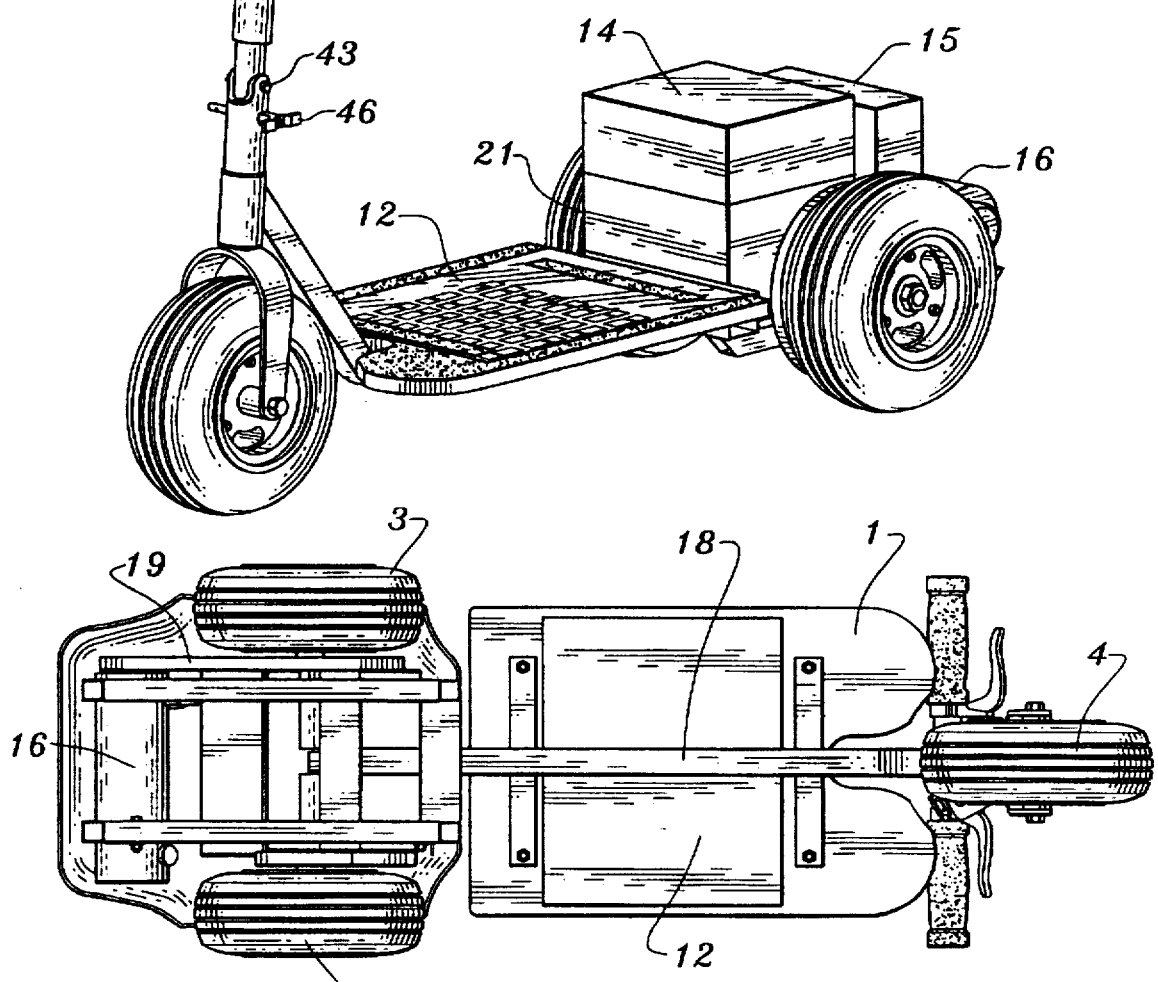
FIG. 3 illustrates the vehicle of the invention with the rear compartment cover removed to reveal the motive elements of the device.

FIG. 4 is a bottom view of the three-wheeled scooter of the invention.

Figure 5:
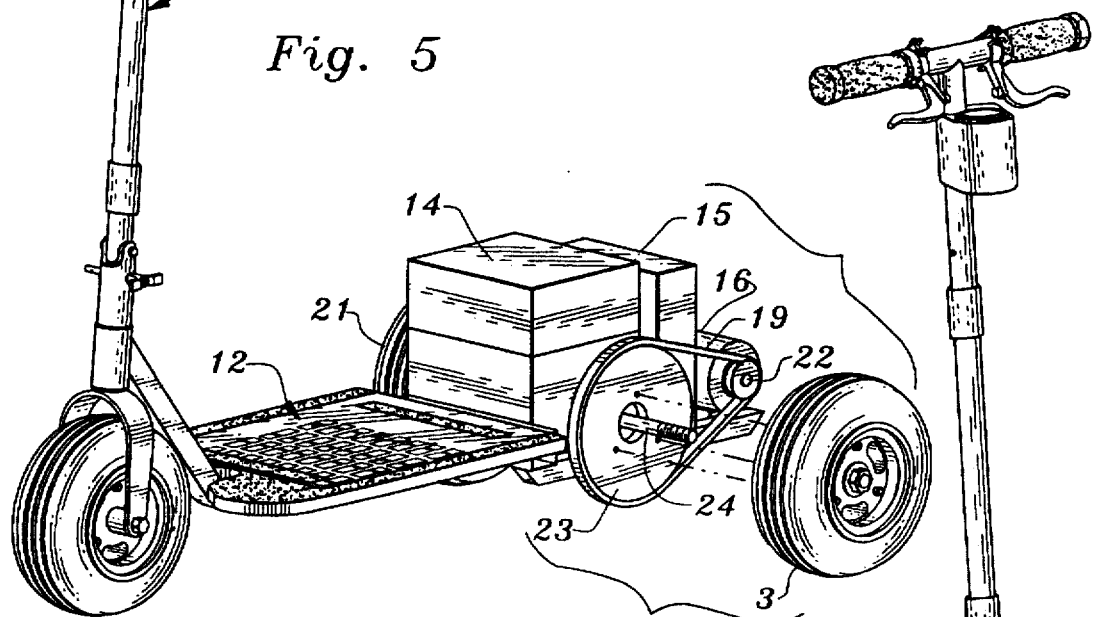

FIG. 5 is a perspective, partially exploded view of the invention showing the left rear wheel removed to illustrate the transmission sprocket and belt.

Figure 6:
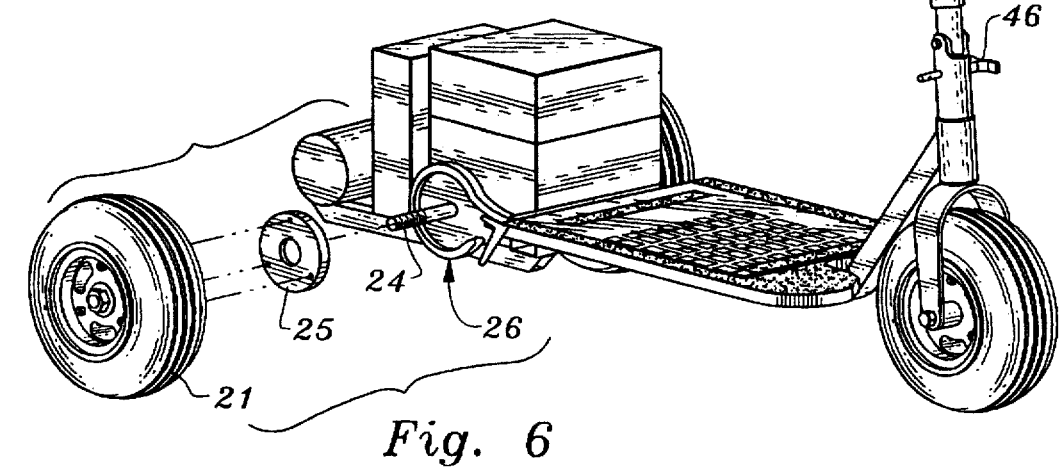

FIG. 6 is a partially exploded perspective view of the invention showing the right rear wheel removed to illustrate some of the elements of the brake.

Figure 7:
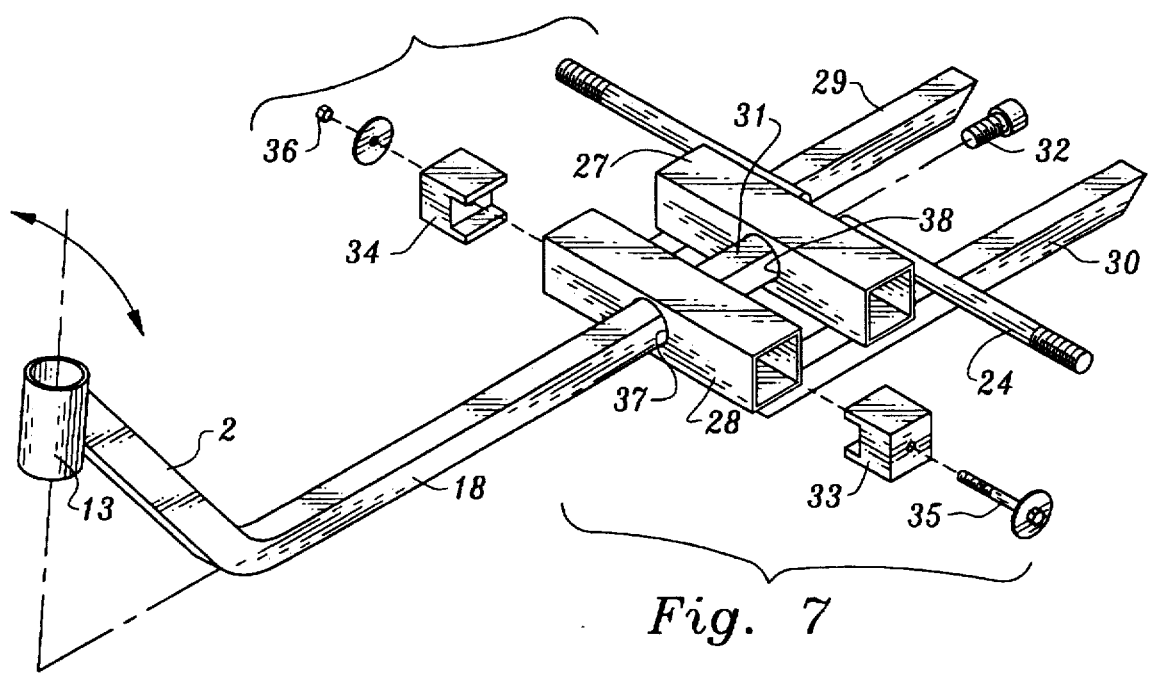

FIG. 7 is a partially exploded perspective view of the chassis and rear bracket element of the invention.

Figure 8:
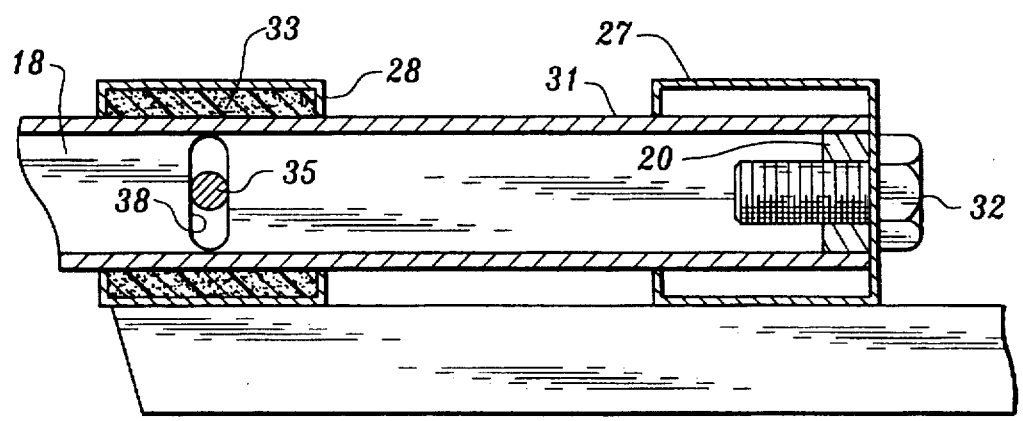

FIG. 8 is a side cut away view illustrating especially the unique suspension system used to attach the rear bracket and wheels to the chassis.

Figure 9:
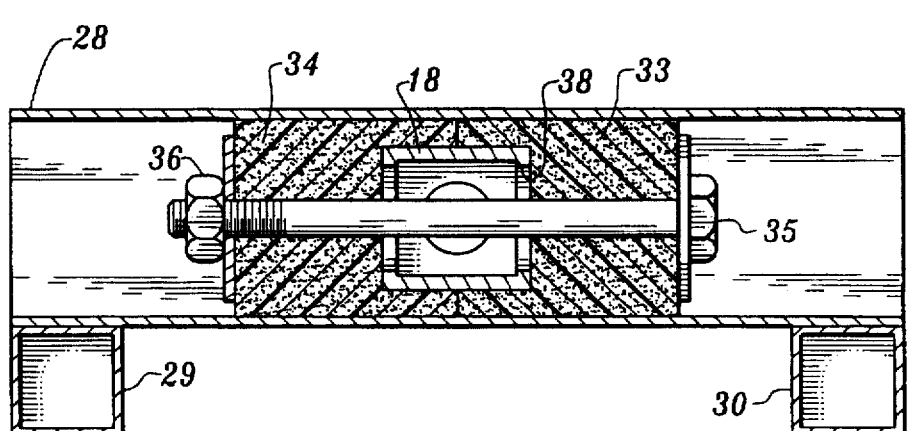

FIG. 9 is a front cut away view illustrating further the flexible connection joint between the forward lateral support member and the middle section of the chassis.

FIG. 10 is a front view of the motor scooter of the invention illustrating the tilting effect produced by the flexible suspension joint employed in the invention.

Figure 11B:
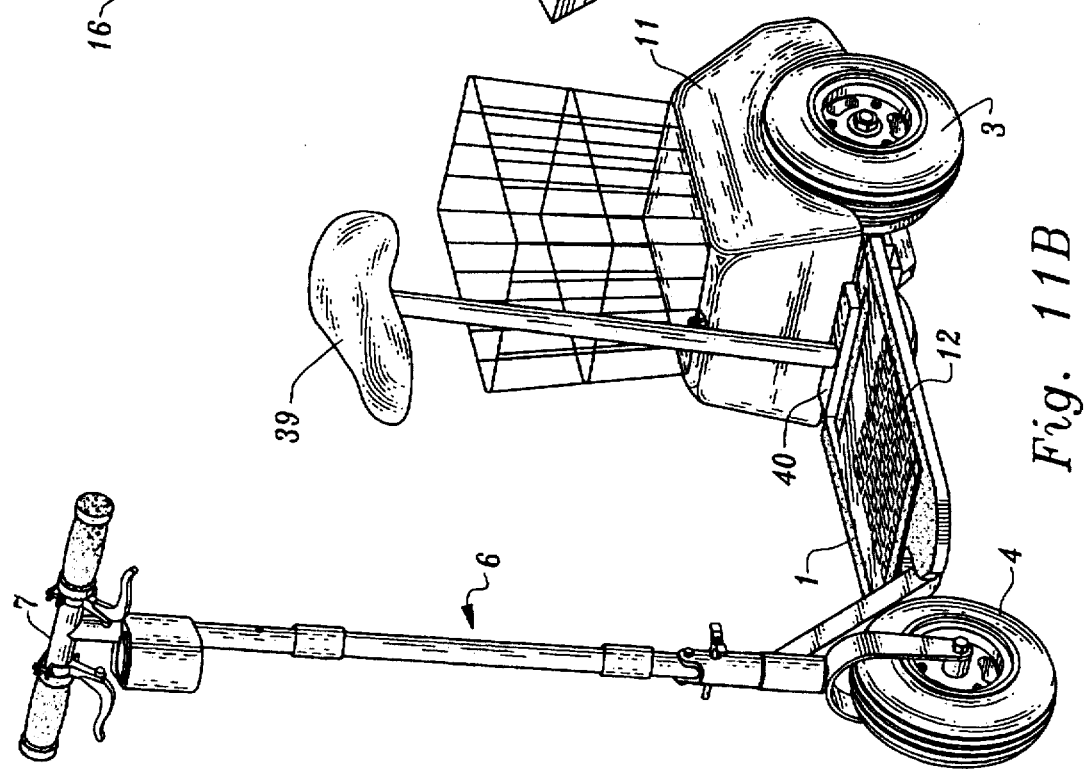

FIGS. 11(A) and 11(B) illustrate two of the motor scooters of the invention equipped with rider seats.

Figure 12:
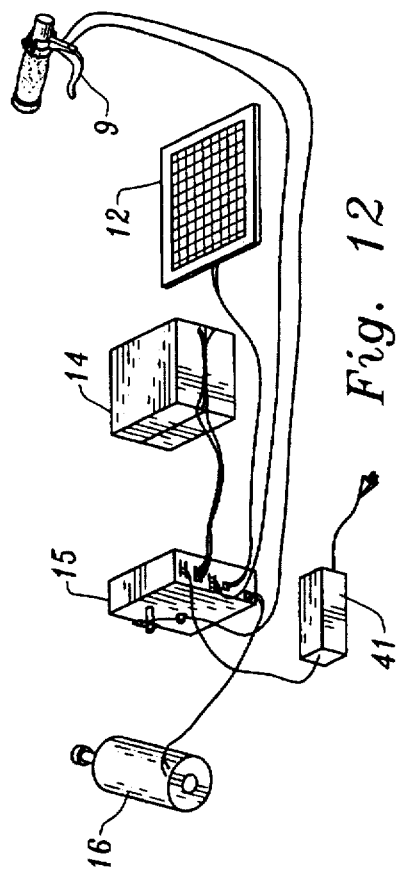

FIG. 12 is a diagram illustrating the wiring of the essential motive elements of the invention.

Figure 13:
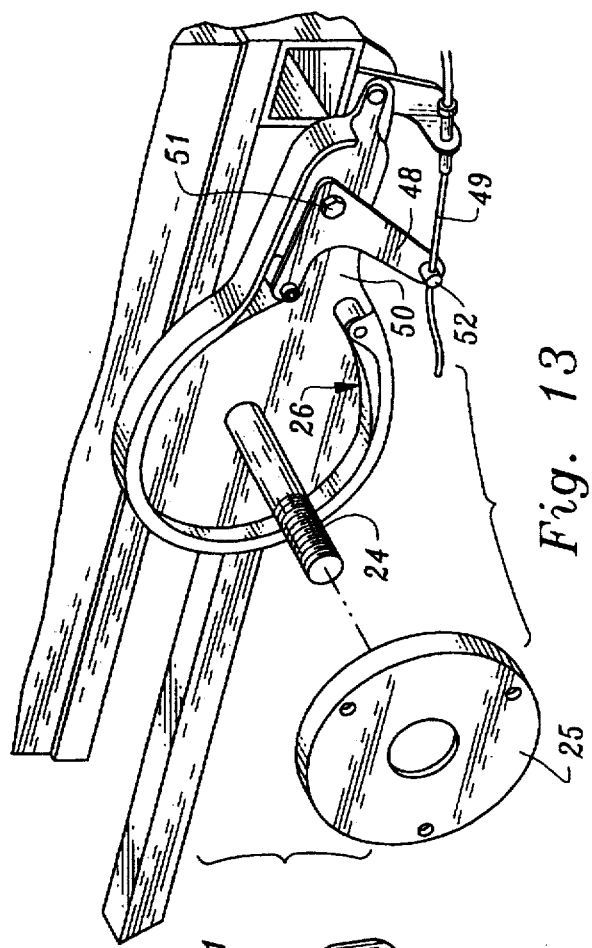

FIG. 13 is a detailed illustration of the brake used in the present invention.

DETAIL DESCRIPTION OF THE INVENTION

In accordance with the present invention an electrically powered three-wheeled vehicle is provided which comprises essentially a chassis which extends between a pair of rear wheels mounted on a rear axle and a single steerable front wheel pivotally mounted on a front axle in engagement with an upright steering column. The vehicle chassis essentially consists of three parts: a forward section which pivotally engages the steering column, a middle section which accommodates one or more persons and includes the solar energy cell array, and a rear section which is joined to a bracket which engages the rear axle and holds the electric motor which drives the rear wheels, the transmission, and a source of stored electric energy such as a battery. Also contained in the rear compartment is a controller which provides modulating pulses of electric energy to the DC motor to enhance speed control and dampen out initial acceleration rate for smooth high starting torque.

Engagement between the middle and rear sections of the chassis and the rear mounting bracket is through a unique elastomeric torsion system. This system allows the front wheel steering column deck and seat to pivot to the side allowing the rider to lean in and out of turns. Thus, as the scooter leans, a small amount of resistance is applied to right the scooter by the elastomeric torsion system. This small amount of resistant makes the scooter easily ridden for persons that may not have a good sense of balance and makes the scooter very easily handled by anyone. The drive components mounted on the rear bracket including the batteries, motor, and a controller unit are all located in the rear frame that does not lean with the forward units. This placement of weight keeps the mass moment of inertia low in the forward frame making the scooter more stable for the rider.

The rear mounting bracket containing the motor, batteries and controller essentially is a rectangular frame which includes two spaced lateral members which transversely engage pivotally with the rear section of the chassis to permit limited lateral rotation of the bracket relative to the longitudinal axles of the chassis. As will be explained in greater detail below with particular reference in the drawings, the most rearward of the lateral members pivotally engages the end of the rear section of the chassis to permit limited rotation of the chassis amount its longitudinal axles while the more forward of the lateral members is provided with a transverse aperture through which a portion of the midsection of the chassis passes. A pair of resilient plugs are located within this forward lateral member to partially restrain the chassis from rotating within the aperture and to provide a cushioning effect on the chassis.

Further details of the invention, however, will be more fully appreciated by having specific reference to the attached drawings which illustrate a preferred embodiment of the invention.

Directing attention initially to FIGS. 1 and 2 of the drawings, the unique three-wheeled scooter of the invention is shown. Floor board 1 enclosing solar cell array 12 is disposed atop the vehicle chassis which extends from forward chassis section 2 back under and in support of the floor board to engage the rear bracket under the rear compartment enclosure 11. The rear wheels 3 and 21 are rotatably mounted on an axle which engages the rear bracket. Front wheel 4, which is steerable, is mounted rotatably on front axle 5 which engages through a mounting yoke with steering column 6. Collar 13 is attached to the forward section of the chassis 2 and allows the steering column and front wheel to be turned by handle bars 7 at the top of the steering column. As shown in FIG. 2 of the drawings, the steering column may be folded back to a horizontal position to facilitate storage in transportation. This folding back of the steering column is conveniently accomplished by means of a sliding joint 10 between the lower section 42 of the steering column and the upper section 17 of the steering column. As seen in the drawings, the upper section of the steering column fits slightably within the lower section. Lower section 42 is provided with an elongated slot 45 which permits the upper section 17 of the column to be partially removed from the lower section while still remaining in engagement with transverse pin 43 which passes both through the lower end of the upper section of the steering column and the two upward protracting ears 44 of the lower section of the steering column. A pin 46 conveniently holds the two sections of the steering column together in upright alignment and is withdrawn when it is desired to fold the steering column into its horizontal position shown in FIG. 2. Brake and throttle controls 8 and 9 are mounted on handle bars 7 and an instrument cluster 47 is mounted at the top of the steering column 6.

FIG. 3 of the drawings illustrates the motor scooter the invention with the rear compartment cover 11 removed to reveal battery 14, pulse width modulation controller 15, DC motor 16, the right rear braking wheel partially shown at 21 and drive wheel 3.

FIG. 4 of the drawings is a bottom view of the three-wheeled motor scooter of the invention and illustrates, in particular, middle chassis section 18 extending back from the forward chassis section 2 to engage with the rear mounting bracket. Drive belt 19 is shown connected to the shaft of motor 16 and wheel 3 through a sprocket (not shown).

FIG. 5 of the drawings further illustrates in greater detail the transmission of rotational force from electric motor 16 to rear drive wheel 3. As illustrated drive belt 19 engages with electric motor shaft 22 and drive sprocket 23 which is bolted to rear wheel 3 which is mounted rotatably on rear axle 24.

FIG. 6 of the drawings is an exploded view illustrating in greater detail braking right wheel 21 which is provided with a brake drum 25 and mounted on rear axle 24. Although various types of brakes can satisfactorily be used in accordance with the present invention, shown is a band brake 26 which engages with the brake drum 25 to provide braking to the wheel of the vehicle. This brake is operated by means of a hand brake shown at 8 on the handle bar and is illustrated in greater detail in FIG. 13.

FIG. 7 of the drawings illustrates in detail the connection between the chassis and rear mounting bracket including the unique mounting joint associated therewith. The elongated chassis consists of a middle chassis section 18, a rear chassis section 31, and a forward chassis section 2, which are joined to steering column mounting collar 13. The rear mounting bracket is essentially a rectangular structure consisting of two longitudinal parallel support members 29 and 30 joined together transversely by rear lateral member 27 and forward lateral member 28. As illustrated, these members are all of hollow rectangular tubular construction. Rear axle 24 is attached across the back of rear lateral member 27 and may or may not be a single unitary member. Either end of the rear axle is appropriately threaded or otherwise provided to accommodate rotational attachment of the respective rear wheels. Both of the lateral support members 27 and 28 are respectively provided with transverse apertures 38 and 37 which pass through the respective lateral members. The apertures in forward member 28 and the most forward aperture in member 27 are sufficiently large to permit rotation of the chassis within the apertures. The end of the rear chassis section 31 is bolted by an adjustable bolt 32 to the rear lateral member 27. As illustrated in FIG. 8 of the drawings, the end of rear chassis section 31 is provided with a fixed nut 20 which is immoveable and which receives adjustable pivot bolt 32 which passes through the smaller, rear aperture in the rear lateral member 27. By loosening or tightening adjusting pivot bolt 32, rotation of the chassis relative to the rear mounting bracket can be facilitated or restrained, although usually pivot bolt 32 is kept sufficiently loose to permit rotation of the chassis with stiffening against rotation being achieved by tightening transverse bolt 35 through resilient members 33 and 34 as described below.

As heretofore described, a unique resilient pivot joint is provided in the forward lateral member 28 to resiliently restrain rotation of the chassis relative to the rear mounting bracket and wheels of the scooter. This arrangement allows a limited amount of tilting of the front and occupant section of the vehicle relative to the rear section as shown, for example in FIG. 10 of the drawings. Two resilient U-shaped elastomeric grommets or plugs 33 and 34 are provided having the same rectangular cross-section as the forward lateral member 28. As illustrated in FIGS. 8 and 9 of the drawings these two elastomeric members fit within the forward lateral member 28 and engage the chassis member 18 passing through transverse aperture 37. The two resilient members 33 and 34 are held in place by a transverse elongated bolt 35 which passes through the two members 33 and 34 and elongated aperture 38 in the chassis section as shown in FIG. 8 of the drawings. A nut and washer 36 engage with the end of the bolt 35 to permit tightening or loosening. The resilient elastomeric members 33 and 34 when bolted in place, provide a cushion resistance to twisting of the forward and middle chassis sections relative to the rear mounting bracket. This resistance can be adjusted by tightening the bolt 35 to compress and stiffen the elastomeric members or can be loosened if less resistance is desired. Elongated aperture 38 in the chassis section permits the chassis section to rotate relative to the two lateral support members 27 and 28 subject to the resistance provided by the elastomeric members within the forward later member and the adjustable pivot bolt 32 attaching the end of the chassis to the rear lateral support member. It will be appreciated in this regard that while the pivot joints at 33 and 34 illustrated in the drawings have been characterized as being elastomeric material such as rubber or polyurethane, various resilient members could also be employed such as relatively stiff springs or pneumatic or hydraulic pistons mounted on either side of the chassis section passing through the lateral member.

FIG. 11(A) and FIG. 11(B) of the drawings illustrate two of the motor scooters of the invention having bicycle type seats 39 mounted on adjustable vertical columns attached at their lower end to mounting plate 40 which engages the floor board of the vehicle.

FIG. 12 of the drawings illustrate typical connection of the electric elements of the invention. Alternative sources of electrical energy solar panel array 12 and battery charger 41 are shown connected to controller 15 which provides controlled pulses of electrical energy to the DC motor 16 which drives at least one of the rear wheels of the vehicle. Delivery of this electrical energy from the controller to the DC motor is in turn controlled by the on off key switch wire and the throttle cable both of which are connected to the handle bar 7. Controller 15 also receives electrical energy from solar panel 12 and storage battery 14 and monitors recharging of battery pack 14 from either the battery charger 41 or the solar energy cell array 12.

As illustrated in the drawings the solar panel is located beneath the clear deck or floor board where the rider's feet are placed during operation. This solar panel when exposed to the sun recharges the battery pack 14. Typically the complete recharged time from a solar source is about 4 days. A typical solar panel used in accordance with the present invention has a power out put of 4.25 watts although a more powerful panel could usefully be employed. Such panels are available commercially for example from Ever Std Development of Hong Kong.

Optionally a battery charger can be employed and is typically of the type used for sealed lead acid batteries or deep cycled batteries. It must be of the automatic type and typically takes from about two to five hours for a fill recharge.

The electric motor used in connection with the present invention is a permanent magnetic variable speed DC motor. This motor operates on direct current and employs high energy ceramic magnets. Typically it will turn about 4200 rpm and produce about one third horse power. For most uses in accordance with the present invention motors within the range of 265 to 575 watts of a current drain are suitable. Located on the end of the motor shaft is a pulley which engages a timing belt that is attached to at least one of the rear wheels. Preferably the type of belt used is a timing belt since very little tension needs to be applied between the motor and wheel to transfer power. Because very little tension is used there is a low radial load against the motor bearings and thus load drag or rolling resistance. The timing belt being rubber provides very quiet power transfer compared to that of a chain driven system.

Typically the present invention operates primarily on a 24-volt DC system. The battery pack consists of two 12 volt sealed lead acid batteries which are bonded together. The positive and negative leads of the batteries plugs into the controller box. Within the controller box the wiring puts the batteries into a series producing 24 volts. Also from the controller box, 12 volts are provided to operate to the key and battery level gauge. When the key is turned on, 12 volts are supplied to a small relay within the controller box which allows 24 volts to be supplied to the pulse width modulation controller. The range of battery capacity at 12 volts is 8 amps per hour to 26 amps per hour with the optimum for range and weight being 17 amps per hour. The electric motor scooter of the invention uses two 12 volt/17 amp hour batteries, however, a single 12 or 24 volt system could be employed.

The pulse width modulation controller employed in the present invention is manufactured by I. P. C. Automation of Lexington, S. C. Number 910s-3522-010. This controller has been modified so that when the throttle is at the off position, and the electric motor free wheels instead of shorting the motor or putting it into a braking mode. The system further provides only forward direction and is provided with fixed resisters to preset the acceleration rate. As employed in accordance with the invention, the pulse width modulation controller has been found to be one of the most efficient ways of speed controlling the variable speed DC motor. The controller operates on 24 volts which are supplied to it by the battery pack and is very efficient since it draws only at about 100 milliamps of current. The use of the controller allows very smooth speed transition which makes the scooter of the invention very easy to ride. It is also efficient and draws low current thereby extending the range of the scooter. The controller is provided with a potentiometer which is rotated to increase speed. Rotation of the potentiometer is accomplished by a small bell crank with a cable attached to it. The cable is attached to the throttle lever located on the right side of the handle grip bar. Pulse width modulation controllers work on the principle of an electronic timing machine that chops up the voltage supplied to the motor into segments. As the potentiometer is rotated, a signal is sent to the controller releasing voltage in segments until a full throttle is reached at which time full voltage is supplied to the motor by the controller.

FIG. 13 illustrates in greater detail the brake used in the present invention, although it will be understood that other braking systems commonly employed to restrain vehicle wheel rotation could also be used. Band 26 is anchored at one end t4) the brake housing 50 and at its other end to one end of arm 48, which is pivotally mounted at 51 also to the brake housing. The lower projection 52 of arm 48 is connected to brake cable 49 so that retraction of the cable by the brake hand grip on the handle bars causes band 26 to be drawn tightly around drum 25 attached to one of the rear vehicle wheels to restrain rotation and brake the vehicle. The brake used in the invention as illustrated is made by Ping Ho Metal Manufacturer of Taiwan Model No.88.

It will be understood and appreciated that the device described herein is illustrative of a preferred embodiment of applicant's invention as defined by the claims appended hereto. Further modifications and alternatives will be apparent to those of ordinary skill in the art and are considered to fall within the scope of the invention as defined by the claims.

What is claimed is:

1. An electrically powered, three wheeled vehicle comprising:

a single, steerable front wheel mounted on a front axle;

an elongated steering column having a lower end which engages with said front axle to enable turning thereof; and, an elongated chassis, having a fore and aft longitudinal axis, said chassis extending between said front and rear axle and comprising a forward section which pivotally engages with said steering column, a middle section to accommodate one or more persons, and a rear section joined to a bracket which engages transversely with said rear axle, said bracket having mounted thereon an electric motor to rotatably drive at least one of said rear wheels, said bracket further including two spaced lateral members which transversely engage pivotally with said rear section of said chassis to permit limited lateral rotational movement of said bracket relative to said longitudinal axis of said chassis, a rotational force from said motor to said driven rear wheel, a source of stored electrical energy to power said motor, and a controller disposed between said source and said motor to control delivery of said power to said motor.

2. The vehicle of claim 1 wherein said steering column contains an adjustable joint means proximate its lower end to permit an upper section of said column to be folded back to a horizontal position.

3. The vehicle of claim 1 wherein one of said lateral members pivotally engages the end of said rear section of the chassis to permit limited rotation of said chassis about its longitudinal axis relative to said one lateral member, the second lateral member being disposed forward of said pivotal engagement and being provided with a transverse aperture through which a portion of the rear section of said chassis passes, said chassis being partially restrained from rotating within said aperture by a pair of resilient members mounted within said second lateral member on either side of and in close engagement with the said portion of the chassis.

4. The vehicle of claim 3 wherein said pair of resilient members are disposed on either side of said chassis portion and held in said close engagement by an elongated member passing through said resilient members and transversely through an aperture in said chassis.

5. The vehicle of claim 1 wherein said controller controls the rotational speed of said motor by modulating pulses of electrical energy supplied to said motor in response to commands from the vehicle operator.

6. The vehicle of claim 1 wherein said transmission includes a belt, chain, or gear which transmits rotational force from the shaft of said motor to a sprocket on one of said rear wheels.

7. The vehicle of claim 1 wherein at least one of said rear wheels is provided with a brake.

8. The vehicle of claim 1 which includes an array of solar electric cells which produce an electric current in response to light, and which cells are connected to recharge said source of electrical energy.

9. The vehicle of claim 8 wherein said solar electric cells are disposed on the middle section of said chassis.

10. The vehicle in claim 1 which includes a seat for accommodating the operator mounted on said middle section.

11. The vehicle of claim 1 wherein braking and speed controls are mounted on said steering column.

12. The vehicle of claim 4 wherein said resilient members can be compressed or relaxed by adjustment of said elongated number.

13. An electrically powered, three wheeled vehicle comprising:

a pair of rear wheels each mounted at either end of a rear axle;

a single, steerable front wheel mounted on a front axle;

an elongated steering column whose lower end engages with said front axle to enable turning thereof; and, an elongated chassis extending between said front and rear axle and comprising a forward section which pivotally engages with said steering column, a middle section to accommodate one or more persons, and a rear section joined to a bracket which engages transversely with said rear axle, said bracket having mounted thereon an electric motor to rotatably drive at least one of said rear wheels, a transmission to transmit rotational force from said motor to said driven rear wheel, a source of stored electrical energy to power said motor, and an elongated controller disposed between said source and said motor to control delivery of said power to said motor; said bracket including two spaced lateral members which transversely engage pivotally with the rear section said chassis to permit limited lateral rotational movement of said bracket and rear axle relative to the longitudinal axis of said chassis; one of said lateral members pivotally engaging the end of said rear section of the chassis to permit limited rotation of said chassis about its longitudinal axis relative to said one lateral member, the second lateral member being disposed forward of said pivotal engagement and being provided with a transverse aperture through which a portion of the rear section of said chassis passes, said chassis being partially restrained from rotating within said aperture by a pair of resilient members mounted within said second lateral member on either side of and in close engagement with the said portion of the chassis.

14. The vehicle of claim 13 wherein said resilient members are plugs of elastomeric material.

15. The vehicle of claim 14 wherein said plugs are U-shaped which completely engage and laterally envelope the section of chassis within said second later member.

16. The vehicle of claim 15 wherein said pair of plugs are disposed on either side of said chassis portion and held in said close engagement by an elongated member passing through said resilient members and transversely through an aperture in said chassis.

17. The vehicle of claim 13 wherein said controller controls the rotational speed of said motor by modulating pulses of electrical energy supplied to said motor in response to commands from the vehicle operator.

18. The vehicle of claim 13 wherein said transmission includes a belt, chain, or gear which transmits rotational force from the shaft of said motor to a sprocket on one of said rear wheels.

19. The vehicle of claim 13 wherein at least one of said rear wheels is provided with a brake.

20. The vehicle 13 which includes an array of solar electric cells which produce an electric current in response to light, and which cells are connected to recharge said source of electrical energy.

21. The vehicle in claim 13 which includes a seat for accommodating the operator mounted on said middle section.

22. The vehicle of claim 13 where said resilient members can be compressed or relaxed by adjustment of said elongated member.

* * * * *